United States Patent [19]

Tsubaki

[11] 4,183,992

[45] Jan. 15, 1980

[54] VIBRATION-ABSORBING HEAT-INSULATING PLATE

[75] Inventor: Yosuke Tsubaki, Toyota, Japan

[73] Assignee: Toyota Jidosha Kogyo Kabushiki Kaisha, Toyota, Japan

[21] Appl. No.: 955,455

[22] Filed: Oct. 27, 1978

Related U.S. Application Data

[63] Continuation-in-part of Ser. No. 882,195, Feb. 28, 1978.

[30] Foreign Application Priority Data

Jul. 25, 1978 [JP] Japan .................................. 53-89682

[51] Int. Cl.[2] ................................................ B32B 7/00

[52] U.S. Cl. .................................... 428/245; 428/256; 428/257; 428/258; 428/259

[58] Field of Search ............... 428/245, 255, 256, 257, 428/258, 259, 443, 444

[56] References Cited

U.S. PATENT DOCUMENTS 2,728,700 12/1955 Gatke .................................. 428/256

*Primary Examiner*—James J. Bell

*Attorney, Agent, or Firm*—Koda and Androlia

[57] ABSTRACT

A vibration-absorbing heat-insulating plate which is mounted such that there is a gap between the plate and a surface of a heat source. The vibration-absorbing heat-insulating plate includes at least one portion made from metal which is provided adjacent the greatest thermal effect of the heat source and at least one vibration-absorbing portion integrally coupled to the metal portion adjacent a smallest thermal effect of the heat source and the vibration-absorbing portion is made from a cloth-like material formed by weaving filiform asbestos and metal wire together.

5 Claims, 6 Drawing Figures

VIBRATION-ABSORBING HEAT-INSULATING PLATE

This is a continuation of application Ser. No. 882,195, filed 2-28-78.

BACKGROUND OF THE INVENTION

1. Field of the Invention

This invention relates to heat-insulating plates and more particularly to heat-insulating plates which are used with vibrating heat sources, such as motor vehicles.

2. Prior Art

In the prior art, automobile engines are usually provided with heat-insulating plates around the exhaust manifolds and hot air intakes, etc. (which are the principle source of heat in motor vehicle engine) in order to alleviate heat damage from these heat sources. Conventionally, however, materials with a poor damping effect (e.g. steel plate) have been used for the heat-insulating plates. In order to enhance the heat-insulating effect, such heat-insulating plates are mounted on heat sources so that there is a slight gap between the heat-insulating plate and the surface of the heat source. As a result, such heat-insulating plates have suffered from the following drawbacks. In the case of vibrating heat source such as an automobile engine, etc., the heat-insulating plate itself undergoes elastic vibration so that it becomes an additional source of noise and generates an intense radiant sound. This drawback is especially severe for the case of heat-insulating plate which has a cantilever structure and which is mounted on the engine itself (such as heat-insulating plates which are used to heat-insulate the exhaust manifold of the motor vehicle engine).

To solve this problem, it would be possible to change the resonant frequency of the heat-insulating plate by altering the weight of the heat-insulating plate or installing weights on the plate in order to reduce the vibration of the heat-insulating plate accompanying the vibration of the engine. However, in the case of a vibrating heat source whose vibrating frequency varies greatly with conditions of operation, such as a motor vehicle engine, it is very difficult to set the resonant frequency of the heat-insulating plate to avoid the entire range of vibration frequencies generated. Furthermore, such a tactic, moreover, fails to provide a real solution to the problem.

In addition to solve this problem it would also be possible to make the entire heat-insulating plate of asbestos instead of metal plate. However, the problem arises here in that if asbestos is used for the portion of the heat-insulating plate to which a great thermal effect is exerted by the heat source, the heat will turn the asbestos into a powder. Accordingly, asbestos cannot be used in this way in heat-insulating plates.

The present Applicant has previously proposed a vibration-absorbing heat-insulating plate such as the one shown in FIGS. 1 and 2 as a means for eliminating the above drawbacks. Such vibration-absorbing heat-insulating plate is described in Application for U.S. Pat. No. 882,195. This heat-insulating plate is installed, for example, around the exhaust manifold 6 of a six-cylinder engine 4. The heat-insulating plate consists of a metal plate 10 which covers the surface of the area extending from the second cylinder to the sixth cylinder where the greatest thermal effect is exerted by the exhaust manifold 6. For the sake of illustration, that portion of the plate covering the area extending from the fifth cylinder to the sixth cylinder is omitted from the figures. In addition a vibration-absorbing part 12 which covers the surface of the area at the front end in the vicinity of the first cylinder, where the thermal effect is relatively small, is integrally connected by a joint 11 to the steel plate 10 and is principally made of asbestos. Bolts 14 fasten the vibration-absorbing heat-insulating plate 8 to the engine 4 along the manifold 6. By constructing a vibration-absorbing heat-insulating plate described above, it is possible to create a heat-insulating plate which suppresses vibration of the engine without sacrificing the heat-insulating effects of the heat-insulating plate. Accordingly, it is possible to suppress radiant noise generated by the heat-insulating plate. However, this device has suffered from a particular disadvantage. The disadvantage is that depending on the structure of the vibration-absorbing part, the vibration-absorbing part is difficult to manufacture and had poor durability.

SUMMARY OF THE INVENTION

Accordingly, it is the general object of the present invention to provide a vibration-absorbing heat-insulating plate which is able to prevent heat damage from a vibrating heat source and in which radiant noise generated by vibration of the heat-insulating plate is minimized. It is another object of the present invention to provide vibration-absorbing heat-insulating plate which is easy to manufacture and durable.

In keeping with the principles of the present invention, the objects are accomplished by unique vibration-absorbing heat-insulating plate which is mounted such that there is a gap between the plate and a surface of the heat source. The vibration-absorbing heat-insulating plate includes at least one portion made from metal which is provided adjacent the greatest thermal effect of the heat source and at least one vibration-absorbing portion integrally coupled to the metal portion adjacent the smallest thermal effect of the heat source and the vibration-absorbing portion is made from a cloth-like material formed by weaving filiform asbestos and metal together.

BRIEF DESCRIPTION OF THE DRAWINGS

The above-mentioned features and objects of the present invention will become more apparent with reference to the following description taken in conjunction with the accompanying drawings wherein like reference numerals denote like elements, and in which.

DETAILED DESCRIPTION OF THE INVENTION

Figure 1:
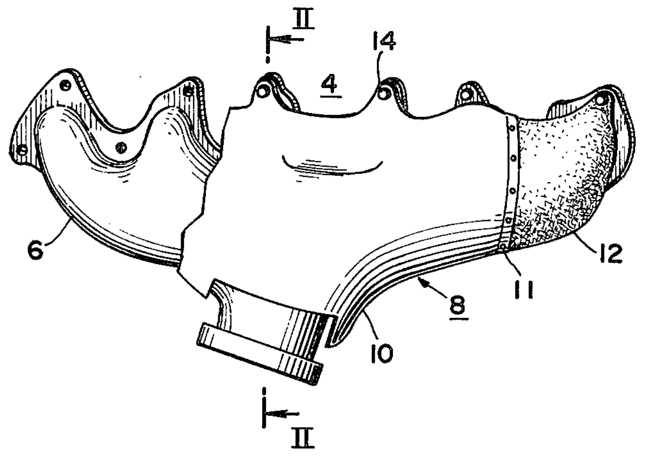
FIG. 1 is an oblique view illustrating a vibration-absorbing heat-insulating plate provided on the exhaust manifold of a six-cylinder motor vehicle engine.
Figure 2:
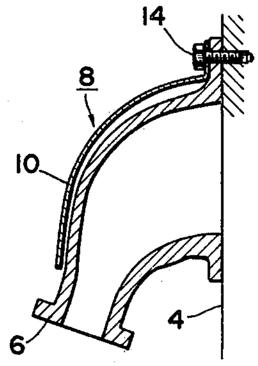
FIG. 2 is a cross section along the line II—II in FIG. 1.
Figure 3:
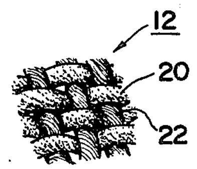
FIG. 3 is an oblique view illustrating the structure of one embodiment of a vibration-absorbing part of the vibration-absorbing heat-insulating plate in accordance with the teachings of the present invention.

Referring more particularly to the drawings, shown therein is a vibration-absorbing heat-insulating plate in accordance with the teachings of the present invention. The heat-insulating plate of the present invention is similar to that described and shown in conjunction with FIGS. 1 and 2 except that the vibration-absorbing part 12 is manufactured from a cloth-like material, as shown in FIG. 3, which is formed by weaving filiform asbestos 20 and metal wire 22 together. In a preferred embodiment, the wire 22 should be corrosion-resistant stainless steel wire.

Figure 4:
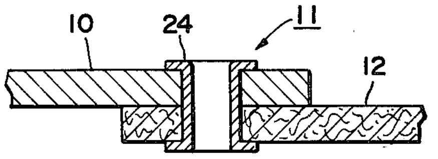
FIGS. 4, 5 and 6 are cross sections illustrating various methods for joining the steel plate and the vibration-absorbing part of the vibration-absorbing heat-insulating plate in accordance with the teachings of the present invention.
Figure 5:
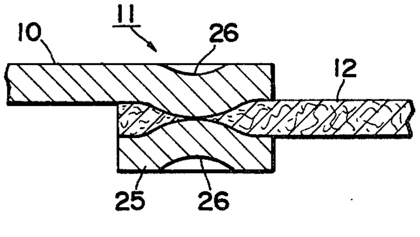
Figure 6:
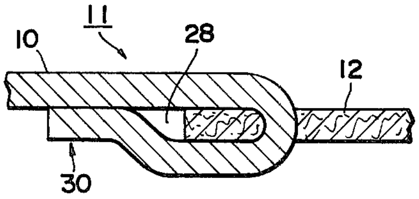

When the vibration-absorbing part is made from the cloth-like material in FIG. 3, it must be coupled to the metal plate 10 by some means. Various coupling methods can be utilized to form the integral joint 11 between the steel plate 10 and the vibration-absorbing part 12. Examples of such methods are shown in FIGS. 4 through 6. In FIG. 4, the ends of the steel plate 10 and the vibration-absorbing part 12 are overlapped and joined together by means of rivets. In FIG. 5, the end of the vibration-absorbing part 12 can be sandwiched between the end of the steel plate 10 and a band-like steel plate 25 and opposing spots 26 on the steel plate 10 and band-like steel plate 25 spot-welded together. In FIG. 6, the end of the steel plate 10 is bent back to form a U-shaped space 28 and the end of the vibration-absorbing part 12 is inserted into the U-shaped space 28 and the folded part 30 of the steel plate 10 is spot-welded.

In this embodiment, the portion of the heat-insulating plate covering the area in the vicinity of the first cylinder wherein the cooling effect of the slipstream air is greatest is the vibration-absorbing part 12. Accordingly, the filiform asbestos forming the vibration-absorbing part 12 is not heated to excessive temperatures and the durability of the vibration-absorbing part is therefore very good. Furthermore, while the vibration-absorbing part 12 was installed only at one end of the heat-insulating plate in the vicinity of the first cylinder of the engine, it should be apparent to the location and total area of vibration-absorbing part are not limited to this arrangement and it would be possible to install the vibration-absorbing part near the center or around the entire periphery of the heat-insulating plate.

Furthermore, while the heat-insulating plate has been described in terms of being installed around the exhaust manifold of a motor vehicle engine, the applications of the present invention are not so limited and it is clear that it would be possible to apply this invention to heat-insulating plates and store around the hot air intakes of automobile engines or to heat-insulating plates installed on vibrating heat sources other than motor vehicle engines.

From the above description, it should be apparent that the present invention possesses many desirable advantages. In particular, the heat-insulating plate of the present invention makes it possible to suppress the vibration of the heat-insulating metal plate without sacrificing the heat-insulating effect. Accordingly, the heat-insulating plate in accordance with the teachings of the present invention makes it possible to reduce radiant noise generated by the heat-insulating plate. In addition, the heat-insulating plate in accordance with the teachings of the present invention includes a vibration-absorbing part which can be easily manufactured and has superior durability.

It should be apparent to one skilled in the art that the above-described embodiments are merely illustrative but a few of the many possible specific embodiments which represent the application of the principles of the present invention. Numerous and various other arrangements can be readily devised by those skilled in the art without departing from the spirit and scope of the invention.

I claim:

1. A vibration-absorbing heat-insulating plate which is mounted on a heat source such that there is a gap between the plate and a surface of said heat source, said vibration-absorbing heat-insulating plate comprising:

at least one portion made from metal which is provided adjacent the greatest thermal effect of said heat source; and at least one vibration-absorbing portion integrally coupled to the metal portion adjacent the smallest thermal effect of said heat source, said vibration-absorbing portion being made from a cloth-like material formed by weaving filiform asbestos and metal wire together.

2. A vibration-absorbing heat-insulating plate according to claim 1 wherein said heat source is a motor vehicle engine.

3. A vibration-absorbing heat-insulating plate according to claim 2 wherein said metal wire is stainless steel wire.

4. A vibration-absorbing heat-insulating plate according to claim 3 wherein said vibration-absorbing heat-insulating plate is mounted on a manifold of said motor vehicle engine.

5. A vibration-absorbing heat-insulating plate according to claim 4 wherein said vibration-absorbing portion is provided in a front portion of said motor vehicle engine.

* * * * *